US012478138B2

(12) United States Patent
Poegl et al.

(10) Patent No.: US 12,478,138 B2
(45) Date of Patent: Nov. 25, 2025

(54) SHOE AND SHOE UPPER WITH OPTIMIZED SHAPE-HOLDING PROPERTIES

(71) Applicant: adidas AG, Herzogenaurach (DE)

(72) Inventors: Florian Poegl, Herzogenaurach (DE); Florian Godenberg, Neustadt an der Aisch (DE); Matthias Linz, Scheinfeld (DE)

(73) Assignee: adidas AG, Herzogenaurach (DE)

(*) Notice: Subject to any disclaimer, the term of this patent is extended or adjusted under 35 U.S.C. 154(b) by 244 days.

(21) Appl. No.: 16/893,048

(22) Filed: Jun. 4, 2020

(65) Prior Publication Data

US 2020/0405003 A1 Dec. 31, 2020

(30) Foreign Application Priority Data

Jun. 26, 2019 (DE) ..................... 10 2019 209 275.6

(51) Int. Cl.

| | |
|---|---|
| ***A43B 23/02*** | (2006.01) |
| ***B32B 5/02*** | (2006.01) |
| ***B32B 5/26*** | (2006.01) |
| ***D04B 1/24*** | (2006.01) |
| ***D04B 9/46*** | (2006.01) |
| ***D04B 9/56*** | (2006.01) |

(52) U.S. Cl.

CPC ........ *A43B 23/0265* (2013.01); *A43B 23/024* (2013.01); *A43B 23/028* (2013.01); *B32B 5/026* (2013.01); *B32B 5/26* (2013.01); *D04B 1/24* (2013.01); *D04B 9/46* (2013.01); *D04B 9/56* (2013.01); *B32B 2437/02* (2013.01)

(58) Field of Classification Search

CPC ....... A43B 1/04; A43B 23/024; A43B 23/028; A43B 23/0265; A43B 23/042; A43B 23/07; A43B 23/0245; D04B 1/24; D04B 9/46; D04B 9/56; D10B 2501/043

See application file for complete search history.

(56) References Cited

U.S. PATENT DOCUMENTS

| | | | |
|---|---|---|---|
| 2013/0074374 A1 | 3/2013 | Droege et al. | |
| 2015/0313316 A1* | 11/2015 | Boucher .................. | D04B 1/16 36/93 |

(Continued)

FOREIGN PATENT DOCUMENTS

| | | |
|---|---|---|
| CN | 106605997 A | 5/2017 |
| CN | 208144577 U | 11/2018 |

(Continued)

OTHER PUBLICATIONS

Extended European Search Report in EP App. No. 20182329.1, mailed Oct. 26, 2020 (8 pages).

*Primary Examiner* — Aiying Zhao

(74) *Attorney, Agent, or Firm* — Sterne, Kessler, Goldstein & Fox P.L.L.C.

(57) ABSTRACT

An upper for a shoe includes a first tubular textile layer and a second tubular textile layer. The first tubular textile layer is at least partially surrounded by the second tubular textile layer thus forming an internal textile layer and an external textile layer. The first tubular textile layer includes a first zone. The first zone includes a first yarn and the first tubular textile layer includes a second yarn. The first yarn is more resilient than the second yarn, and the first zone includes a polygonal shape.

16 Claims, 5 Drawing Sheets

(56) References Cited

U.S. PATENT DOCUMENTS

| | | | | |
|---|---|---|---|---|
| 2016/0143394 | A1* | 5/2016 | Ikenaka | D04B 1/22<br>66/170 |
| 2016/0302524 | A1* | 10/2016 | Smith | A43B 13/12 |
| 2017/0099909 | A1* | 4/2017 | Lee | A43B 23/0295 |
| 2017/0181501 | A1* | 6/2017 | Gautier | A43C 1/00 |
| 2017/0202295 | A1 | 7/2017 | MacGilbert et al. | |
| 2017/0311672 | A1* | 11/2017 | Hipp | D04B 1/26 |
| 2018/0020763 | A1* | 1/2018 | Hipp | A43B 7/14<br>36/47 |
| 2018/0055137 | A1* | 3/2018 | Fraser | A43B 5/14 |
| 2018/0168271 | A1* | 6/2018 | Ly | A43B 23/042 |
| 2018/0206585 | A1 | 7/2018 | Cai et al. | |
| 2018/0235318 | A1* | 8/2018 | Terai | A43B 23/0235 |
| 2018/0332920 | A1* | 11/2018 | Burch | A43B 23/0215 |
| 2019/0159550 | A1* | 5/2019 | Dean | A43B 1/04 |

FOREIGN PATENT DOCUMENTS

| | | | |
|---|---|---|---|
| CN | 107006948 | A | 9/2020 |
| DE | 10 2017 223 737 | A1 | 6/2019 |
| DE | 10 2017 223 746 | A1 | 8/2019 |
| EP | 3 338 585 | A1 | 6/2018 |
| EP | 3501316 | A1 | 6/2019 |
| EP | 3508628 | A1 | 7/2019 |
| JP | 2016-041510 | A | 3/2016 |

* cited by examiner

SHOE AND SHOE UPPER WITH OPTIMIZED SHAPE-HOLDING PROPERTIES

TECHNICAL FIELD

The present invention relates to a shoe, an upper of a shoe, and a method of manufacturing the shoe and the upper.

TECHNICAL BACKGROUND

An article of footwear usually includes two primary elements, an upper and a sole element. In recent years, the manufacture of uppers includes a double textile layer construction, namely a first inner layer and a second outer layer proved to provide a plurality of advantages like comfort, flexibility as well as a cheaper manufacture. However, creating an upper having a double textile layer often results in a lot of wrinkles, folds and creases due to the presence of the at least partially disconnected inner and outer layers. To avoid these disadvantages, costly additional manufacturing steps may be required, like fusion of low melt yarns by heat treatments or the manufacture of additional stabilizing parts to provide an upper with a sufficient amount of form and shape.

For instance, EP 3 338 585 A1 relates to footwear including an inner knitted fabric and an outer knitted fabric that are connected by a stitch row at a top line. US 2016/0143394 A1 relates to a method for producing a shoe upper including a tubular inner side knitted fabric portion to become an inner side portion of the shoe upper and a tubular outer side knitted fabric portion to become an outer side portion of the shoe upper, which are knitted with the inner side knitted fabric portion and the outer side knitted fabric portion lined on left and right on the needle beds and with foot insertion opening corresponding portions of the knitted fabric portions connected.

Further, CN208144577 U relates to one-piece multilayer socks shoes. The socks shoes including the face and sole are made of an elastic yarn to knit a socks shoes face. The face includes an inner layer fabric body and an outer layer fabric body of the socks shoes and a lining support body in between both layers with a fabric body.

Furthermore, CN106605997 A relates to a pair of sock shoes, wherein the shape of the vamp is identical to the curve shape of the foot of the human body. The vamp is a sock obtained using basic cotton or synthetic fiber yarns and adding heating fuse silks. The vamp is subjected to heat shaping after being sleeved on a shoe last. JP2016041510A relates to a shoe having a particularly seamless integrally moulded structure comprising two socks. The internal sock is braided with a low melting point yarn and nylon elastic yarns. A hollow mold is put into the interior of the surface socks and baking is used to fix the surface texture and form of the yarn.

It is therefore an object underlying the present invention to improve shoes and uppers of shoes so that the above outlined disadvantages are at least partly overcome. It is also an object underlying the present invention to provide a more efficient method of producing the same.

SUMMARY OF THE INVENTION

The above-mentioned problem is at least partly solved by the subject matter described herein.

In an embodiment, an upper for a shoe includes a first tubular textile layer and a second tubular textile layer, wherein the first tubular textile layer is at least partially surrounded by the second tubular textile layer thus forming an internal textile layer and an external textile layer. The first tubular textile layer includes a first zone, wherein the first zone includes a first yarn. The first tubular textile layer includes a second yarn, wherein the first yarn is more resilient than the second yarn and wherein the first zone has a polygonal shape. The polygonal shape may comprise a polygonal border.

The present invention therefore provides, by the introduction of at least one polygonal shaped first zone into the first tubular textile layer, an upper for a shoe with a nice and sportive performance silhouette without the need of adding a considerable amount of highly stiff reinforcing materials like low melting point yarns or chemi-sheets. This enables to attain a softer and more comfortable upper for a shoe which may be suitable for both narrow and wide feet. The term chemi-sheet may refer to a chemical sheet, for example in form of a tape, a film or similar, which may be used to provide reinforcement to various parts of the upper of the shoe.

The inventors have found that a polygonal shape of the first zone improves stability and decreases wrinkles in a two-layered tubular textile element as compared to a rounded shape. It may be noted that as used herein the term "first zone" may not be limited to one interconnected first zone but may also include multiple interconnected or separated smaller parts of the first zone. In some embodiments, the total area of the first textile layer including the first zone may be between 1 to 50%, between 5 to 30%, or between 10 to 20% of the area of the first textile layer. In some embodiments, the first zone comprises a polygonal shape and includes a first corner on a medial side of the upper, a second corner on a lateral side of the upper, and an edge extending between the first corner and the second corner.

The first yarn may include an elastic yarn, which may have an elastic thread as a core and a polyester yarn wrapped around this core as a sheath. The term resilient yarn as used herein may relate to a yarn with the ability to recoil or spring back into shape after bending, stretching, or being compressed. Therefore, by bending, stretching, or compressing two identically sized textile elements including different yarns, the textile element with the smaller deviation when compared to the initial dimensions prior to the bending, stretching or compressing treatment may be referred to as including the more resilient yarn. It may be noted that the second yarn may be at least used within the first tubular textile layer outside of the first zone. Therefore, by using a more resilient yarn in the first zone than outside, this zone may be adapted and specially formed to support at least the silhouette of the first and second tubular textile layer.

In some embodiments, at least a part of the first tubular textile layer and/or the second tubular textile layer is knitted. Using parts of knitted tubular textile layers may provide an upper having a natural and soft knitted character, while the polygonal first zone of the first tubular textile layer may provide the needed support for the second tubular textile layer to still maintain the shape of the upper and for example prevent the throat from collapsing easily. The term tubular textile layer may include textile layers, which are directly knitted in a tubular manner, for example using a circular knitting machine. A tubular textile layer may also be produced by first manufacturing a flat textile layer and then combining the flat layer to a tubular shape by means of sewing, stitching, gluing or similar techniques.

The amount of knitted parts may be adjusted according to the intended use of the shoe including such an upper. In some embodiments at least 40%, 60%, 80%, or 100% of the first tubular textile layer and/or the second tubular textile layer is knitted. It may be appreciated that the scope of the present invention is not limited to only knitted textiles. Similar embodiments with woven, non-woven, braided textiles or other textiles are also possible to be used within the scope of the present invention.

The incorporation of the first zone into the first tubular textile layer may be provided by using an intarsia knitting technique, which may enable a direct transition from the first yarn into the second yarn. In some embodiments, the polygonal shape of the first zone includes less than 20 corners, less than 16 corners, less than 12 corners, or less than 8 corners. Having the polygonal shape of the first zone with angular or sharp corners and/or edges may improve the reduction of creases in the second layer of the upper. In another embodiment, the polygonal shape of the first layer may include rounded off edges and/or rounded off corners in at least one first zone, which may allow an optimized polygonal shaped first zone according to its intended location.

In some embodiments, the first tubular textile layer and the second tubular textile layer are manufactured as a one-piece element. The term one-piece element may be understood as either manufacturing both layers within a single process and therefore being directly connected. This may reduce the costs for production and may increase the overall throughput by omitting an additional step of combining both layers. The term one-piece element may be also understood as manufacturing both layers separately and connecting the first and the second layer in an additional manufacturing step to form the one-piece element by sewing, gluing, by means of a melt yarn (and at least partially melting the melt yarn), a meltable sheet (and at least partially melting the meltable sheet), a chemical sheet, such as an adhesive sheet or tape, or any other suitable means. In doing so, the internal textile layer and the external textile layer may be attached to each other at a collar or ankle area of the upper and/or at least at an area of the upper different from the collar or ankle area, for example at a toe area.

In some embodiments including a one-piece element, the first tubular textile layer may be folded into the second tubular textile layer or the second tubular textile layer may be at least partially folded over the first tubular textile layer. An advantage of the folding is that it integrally provides a foot-receiving opening of the shoe upper and no additional steps of cutting may be required. Therefore, waste is reduced, and the method is simplified, compared to existing methods.

In some embodiments, the first zone is at least located at an instep area, a heel area, a collar area, or a throat area of the first tubular textile layer of the upper. By locating the first zone at areas of the first tubular textile layer that are prone to folding, collapsing, or wrinkling when the upper is finished, the present invention provides an upper in which the undesirable folding, collapsing, or wrinkling of the first and second tubular textile layers may be prevented without the necessity of supplementary reinforcement elements. Alternatively or additionally, the first zone may form at least a part of the collar region of the first tubular textile layer of the upper and/or may be at least connected to the collar region of the first tubular textile layer of the upper.

In another aspect, a shoe including an upper according to any of the above-mentioned embodiments is provided.

In another aspect, a method of manufacturing an upper for a shoe including the steps of manufacturing a first tubular textile layer including a first zone, wherein the first zone comprises a polygonal shape is provided. A further step includes manufacturing a second tubular textile layer and at least partially surrounding the first tubular textile layer with the second tubular textile layer. The first zone includes a first yarn and the first tubular textile layer includes a second yarn, wherein the first yarn is more resilient than the second yarn.

Therefore, a method of manufacturing an upper for a shoe is provided in which the at least one polygonal shaped first zone may be adapted to prevent a creasing of a collar area or a collapsing of a throat and/or instep area of the upper.

In some embodiments, the first yarn includes an elastic yarn. This may improve retaining the shape of the upper immensely compared to a first textile layer consisting only of polyester yarns. Manufacturing the first tubular textile layer and manufacturing the second tubular textile layer may further include knitting at least a part of the first tubular textile layer and/or the second tubular textile layer. Furthermore, at least 40%, 60%, 80%, or 100% of the first tubular textile layer and/or the second tubular textile layer may be knitted.

Alternatively or additionally, manufacturing the first tubular textile layer including the first zone may include incorporating the first zone into the first tubular textile layer by an intarsia knitting technique. Therefore, more innovative shoe upper shapes may be possible with a smart placement of intarsia polygonal shapes of the first zone as the limitations coming from creasing of the upper may have been already prevented.

In some embodiments, the polygonal shape of the first zone includes less than 20 corners, less than 16 corners, less than 12 corners, or less than 8 corners. The polygonal shape may prevent a wrinkling of the first and second textile layers and may smoothen out the surface to provide an upper for a shoe with a better overall look. In another embodiment, the polygonal shape of the first layer may include rounded off edges and/or rounded off corners in at least one first zone, which may allow an optimized polygonal shaped first zone adapted to its intended location.

The manufacturing of an upper may further include manufacturing the first tubular textile layer and the second tubular textile layer as a one-piece element, and furthermore folding the first tubular textile layer into the second tubular textile layer or folding the second tubular textile layer at least partially over the first tubular textile layer. This may reduce the number of steps needed for production of a two-layered shoe upper and therefore provides a more efficient and cheaper method when compared to existing techniques.

In some embodiments the method may further include, locating the first zone at least at an instep area, a heel area, a collar area, or a throat area of the first tubular textile layer of the upper. Alternatively or additionally, the method may further include the steps of forming at least a part of the collar region of the first tubular textile layer of the upper with the first zone and/or connecting the first zone at least to the collar region of the first tubular textile layer of the upper.

In another aspect, a method of manufacturing a shoe is provided that includes manufacturing an upper according to any of the above-mentioned embodiments and attaching a sole to the upper.

SHORT DESCRIPTION OF THE FIGURES

Aspects of the present invention are described in more detail in the following by reference to the accompanying figures.

FIG. 1 shows an embodiment illustrating an upper for a shoe as a one-piece element prior to folding.

FIG. 2*a* shows another embodiment schematically illustrating an internal textile layer of a shoe upper including an indicated first zone in a medial side view.

FIG. 2*b* shows an embodiment schematically illustrating the internal textile layer of the shoe upper including the indicated first zone in a top view.

FIG. 3*a* shows a further embodiment schematically illustrating an internal textile layer of a shoe upper including an indicated first and second zone in a medial side view.

FIG. 3*b* shows an embodiment schematically illustrating the internal textile layer of the shoe upper including an indicated first and second zone in a top view.

DETAILED DESCRIPTION OF SOME EXEMPLARY EMBODIMENTS

In the following, exemplary embodiments of the present invention are described in more detail, with reference to an upper of a shoe and the shoe. While specific feature combinations are described in the following with respect to the exemplary embodiments of the present invention, it is to be understood that the disclosure is not limited to such embodiments. In particular, not all features have to be present for realizing the invention, and the embodiments may be modified by combining certain features of one embodiment with one or more features of another embodiment.

Figure 1:
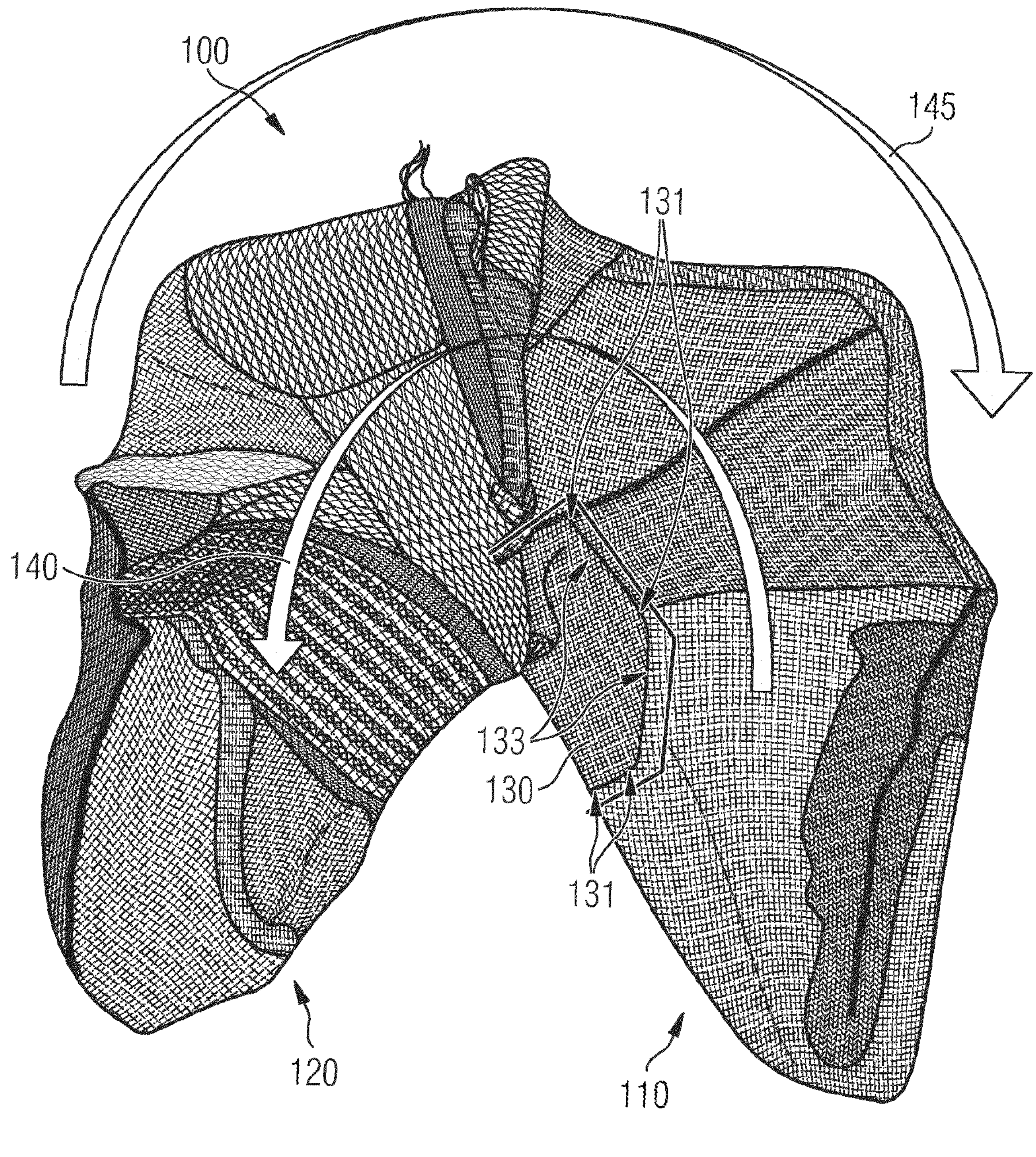

FIG. 1 depicts an upper 100 for a shoe comprising a first tubular textile layer 110 and a second tubular textile layer 120. The two layers 110, 120 may be attached to each other at an ankle area of the upper to form a one-piece element or may be directly manufactured as a one-piece element. The first tubular textile layer 110 may be mainly knitted and includes a first zone 130, which may be incorporated into the first tubular textile layer 110 using an intarsia knitting technique or by similar methods. The first zone 130 includes a first yarn and the first tubular textile layer 110 includes a second yarn. The first yarn is more resilient than the second yarn. Therefore, the first zone 130 is adapted to provide desirable properties to the first zone such as shape-holding, stiffness, stretchability, stability and similar. Some embodiments may include more than one first zone 130, which may include the same first yarn or a yarn with a different degree of resilience than the first yarn, while still being more resilient than the second yarn.

The at least one first zone 130 includes a polygonal shape which may include sharp edges 133 and corners 131. The polygonal shape reduces creasing of the first 110 and second 120 tubular textile layer. A placement of the at least one polygonal first zone 130 at an instep area improves slipping of the foot of the wearer into the shoe including such an upper, due to a better instep area stretchability. The first yarn of the first zone 130 may include an elastic yarn, which may have an elastic thread as a core and a polyester yarn wrapped around this core as a sheath. Other embodiments may include different elastic yarns.

An embodiment of the present invention provides a method to stabilize a first tubular textile layer 110 and a second tubular textile layer 120 due to a clever arrangement of at least one first zone 130. Therefore, a stretchability of such an upper 100 may be unimpeded by the means of stabilizing the shape of the upper 100 according to the present invention. This improves existing shoes, in which a considerable amount of low melting yarns, reinforcement linings, or chemi-sheets, for example, are used to keep a textile upper of a shoe in shape which affects the overall stretchability of the shoe and may even add unnecessary bulk and weight to the shoe upper.

The first tubular textile layer 110 of the upper 100 is folded into the second tubular textile layer 120 depicted by the arrow 140 in FIG. 1. Alternatively, the second tubular textile layer 120 may be at least partially folded over the first tubular textile layer 110 as depicted by the arrow 145 in FIG. 1. In an embodiment including a one-piece upper, such folding 140, 145 provides a method to introduce a foot receiving opening into a one-piece tubular textile element without the need of cutting or similar techniques. This may not only reduce the amount of waste produced but also reduce the risk of undesired stitch openings in knitted or woven textile layers. Furthermore, as the first zones 130 may be located only on the first tubular textile layer 110, which may be the internal textile layer of the upper 100 after folding 140, 145, the first zones 130 may be invisible to a wearer of a shoe including the upper 100 and therefore may not affect the outer design and look of the shoe.

Figure 2A:
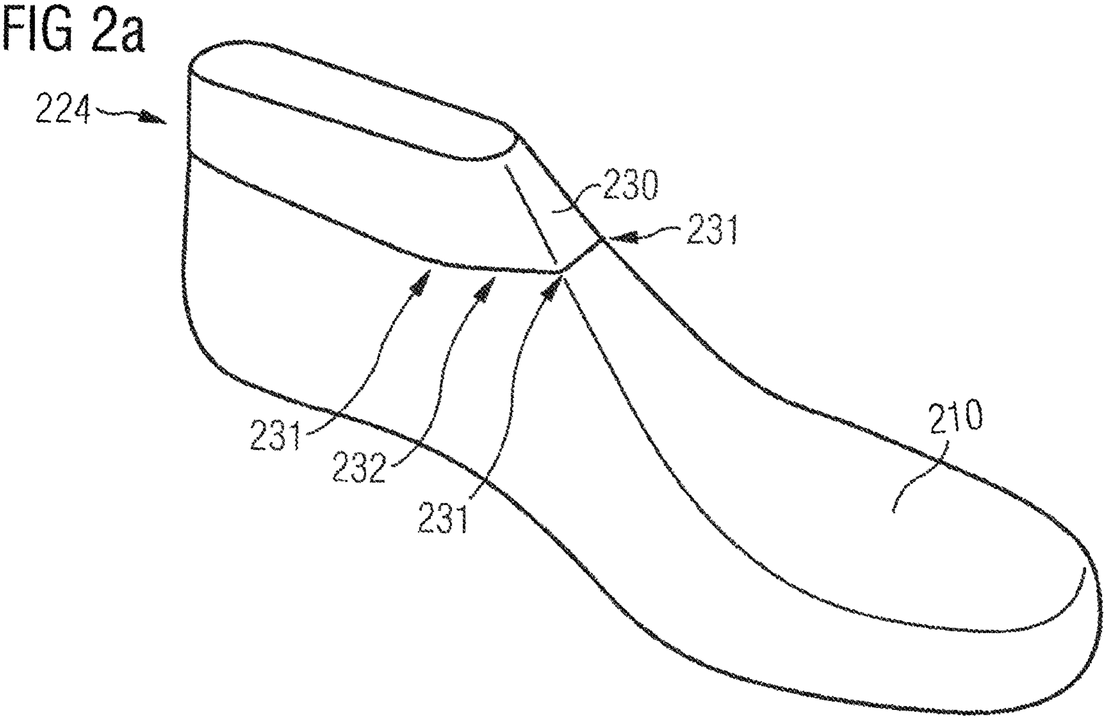
Figure 2B:
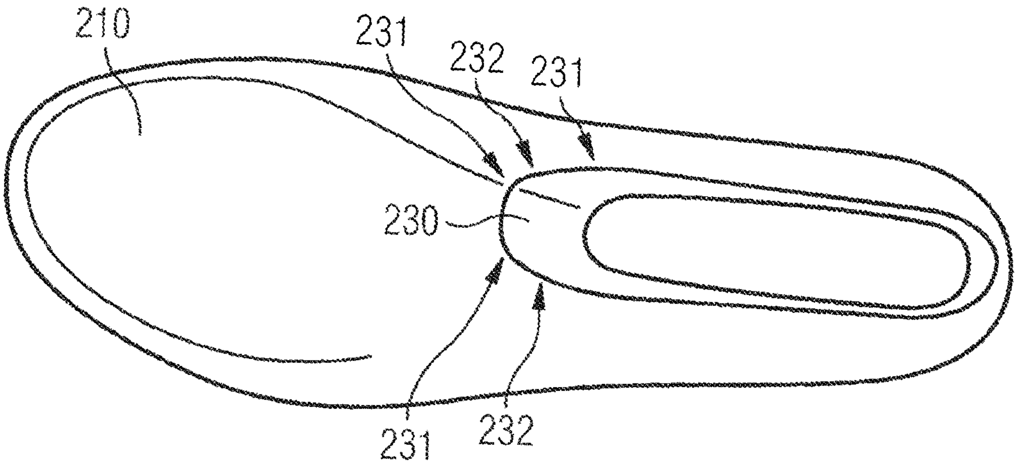

FIGS. 2*a* and 2*b* schematically depict a first tubular textile layer 210 of a shoe upper for a shoe in a medial side view (FIG. 2*a*) and a top view (FIG. 2*b*) including an indicated first zone 230. The indicated first zone 230 includes a polygonal shape which may include rounded off edges 232 and corners 231. As mentioned above, the polygonal shape of the at least one first zone 230 prevents a wrinkling of the external textile layer and thus smoothens out the outer surface of the shoe upper resulting in a better overall look. The first zone 230 depicted in FIGS. 2*a* and 2*b* may form at least a part of the collar region 224 and may completely surround an ankle of a wearer of a shoe including the upper, which may also improve stepping in and/or putting on the shoe. The elastic yarn of the first zone 230 may prevent a collapsing of the collar region 224 and may at the same time provide a higher tolerance for manufacturing and fit as the upper is more flexible and adjustable. The higher tolerance for manufacturing also reduces the wastage of uppers due to bad fit resulting in an environmental friendlier manufacturing compared to already known methods while at the same time leads to notable cost savings and a more efficient production.

Figure 3A:
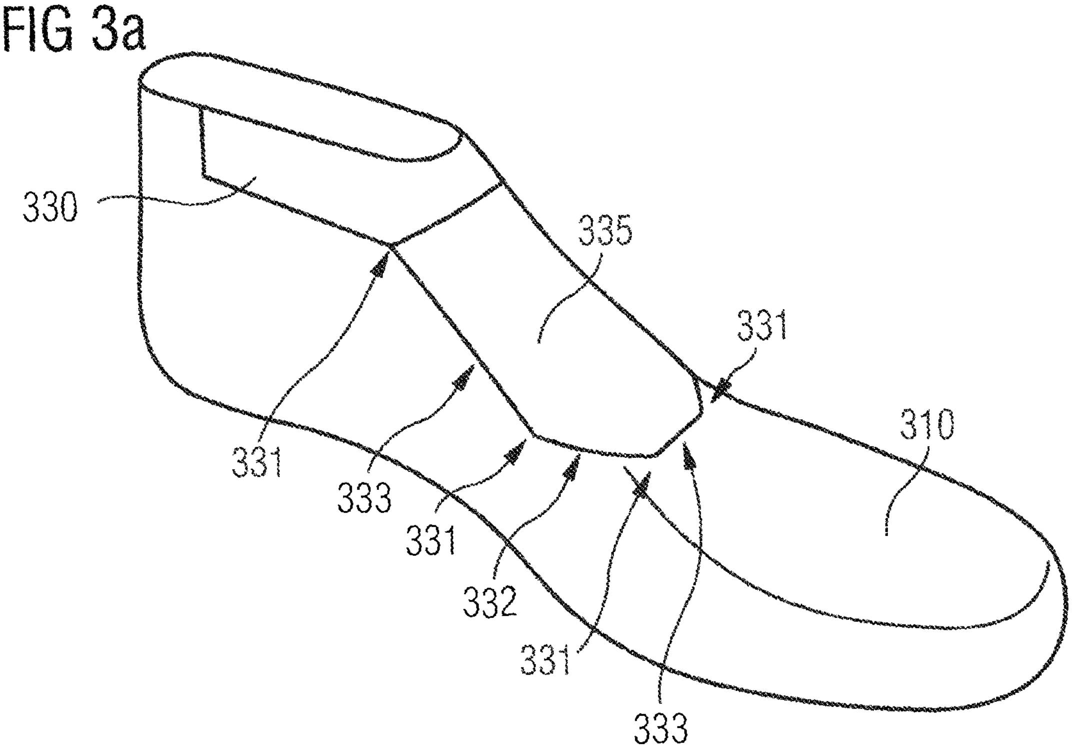
Figure 3B:
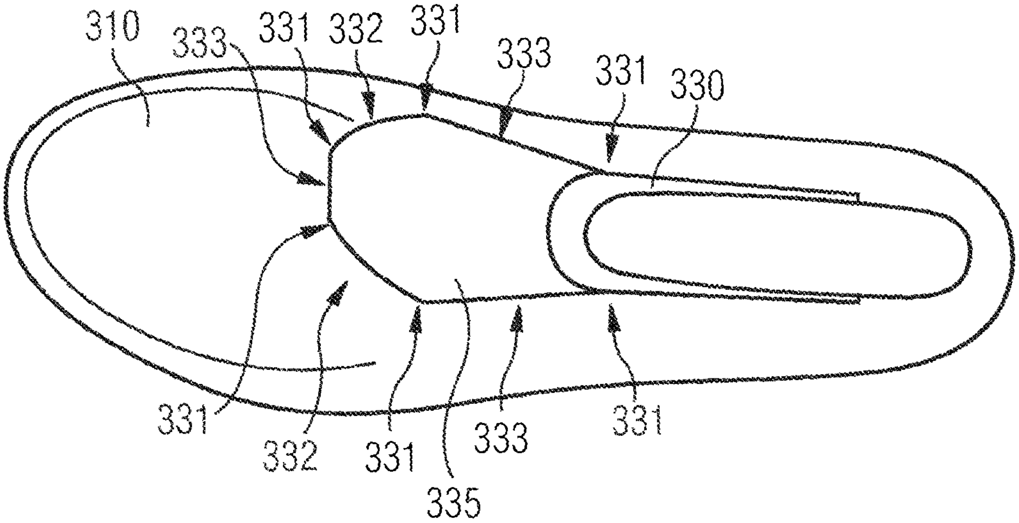

FIGS. 3*a* and 3*b* schematically depict a first tubular textile layer 310 of a shoe upper for a shoe in a medial side view (FIG. 3*a*) and a top view (FIG. 3*b*) including an indicated first zone 330 and an indicated second zone 335. The indicated first 330 and second zone 335 each include a polygonal shape which may include rounded off edges 332 as well as straight edges 333 and corners 331. In some embodiments the first zone 330 may also include rounded off corners (not shown). The first yarn of the first zone 330 may be different from or identical to the first yarn of the second zone 335, while both yarns are still more resilient than the second yarn of the first tubular textile layer 310. The second zone 335 depicted in FIGS. 3*a* and 3*b* may be located at an instep area and therefore may provide a controlled compression on a wearer's foot. The second zone 335 may be connected to the collar region including the first zone 330 which may result in a softer transition from the collar into the instep area to increase support and also comfort of wearing a shoe including such a first zone 330 and second zone 335. Additionally, the combination of zones 330, 335 as depicted in FIGS. 3*a* and 3*b* may also improve the slipping of the foot of the wearer into the shoe to make it smoother. Furthermore, the combination may also result in less post slipping-in adjustments, such as pulling or evening out of creases in the surfaces of the external and/or internal textile layer and therefore increases the satisfaction of the customers. It may be noted, that in another embodiment the at least one first zone may be also located at a different area of the first tubular textile layer 310 as for example a heel area 423, a quarter area 422 or a throat area 425, as indicated in FIG. 4.

Figure 4:
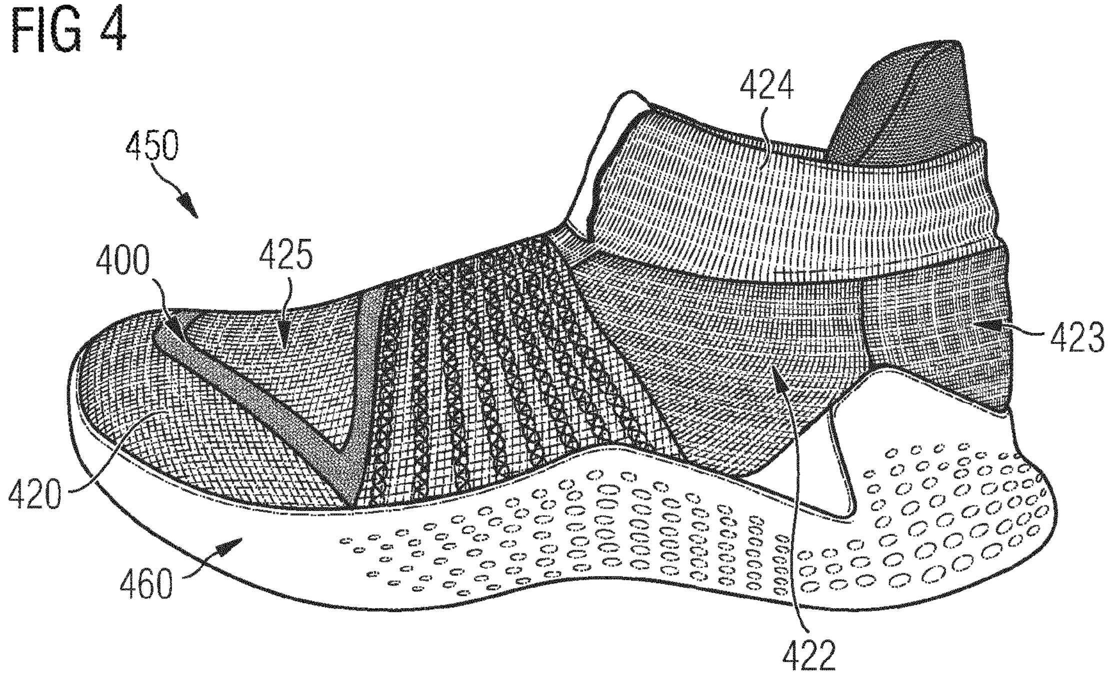
FIG. 4 shows an embodiment of the present invention illustrating a shoe.

FIG. 4 depicts a shoe 450 including an upper 400 and a sole 460. The upper 400 includes a first tubular textile layer folded into a second tubular textile layer 420, wherein both layers are mainly knitted textile layers. The folding provides an effective post processing of the mainly knitted one-piece tubular textile element into the upper 400 of the shoe 450, which may also be applicable to woven, non-woven, braided, crochet or similar manufactured textile layers (not shown). As depicted in FIG. 4, the polygonal shaped at least one first zone is completely covered by the external/second textile layer 420 of the upper 400 and is thus not directly visible to a wearer of the shoe 450. Therefore, the first/inner textile layer including at least one first zone may be manufactured solely according to its intended properties, such as shape-holding property of the internal and external layer, stiffness, stretchability, stability and the like without the limitations due to a desired design and look. On the other hand, the second/external textile layer including no first zone may be manufactured solely according to its intended properties, such as design, overall look, waterproofness or similar. Additionally, as the means for stabilizing the upper 400 of the shoe 450 may be provided by the at least one first zone including an elastic yarn, the stretchability of the shoe 450 may not be lost compared to existing stabilizing means. As depicted in FIG. 4, the at least one polygonal first zone including the more resilient first yarn incorporated into the first tubular textile layer smoothens out the folds and creases by taking in or pulling in the extra fabric that would otherwise form the crease or fold. Thus, it evens out the surface of the inner textile layer and correspondingly the external textile layer of the two-layered textile upper 400 of the shoe 450. The at least one first zone may further prevent a collar area 424 from collapsing in. Therefore, an optimized method of manufacturing a two-layered textile upper with an improved stability, sportive silhouette and overall look.

Figure 5:
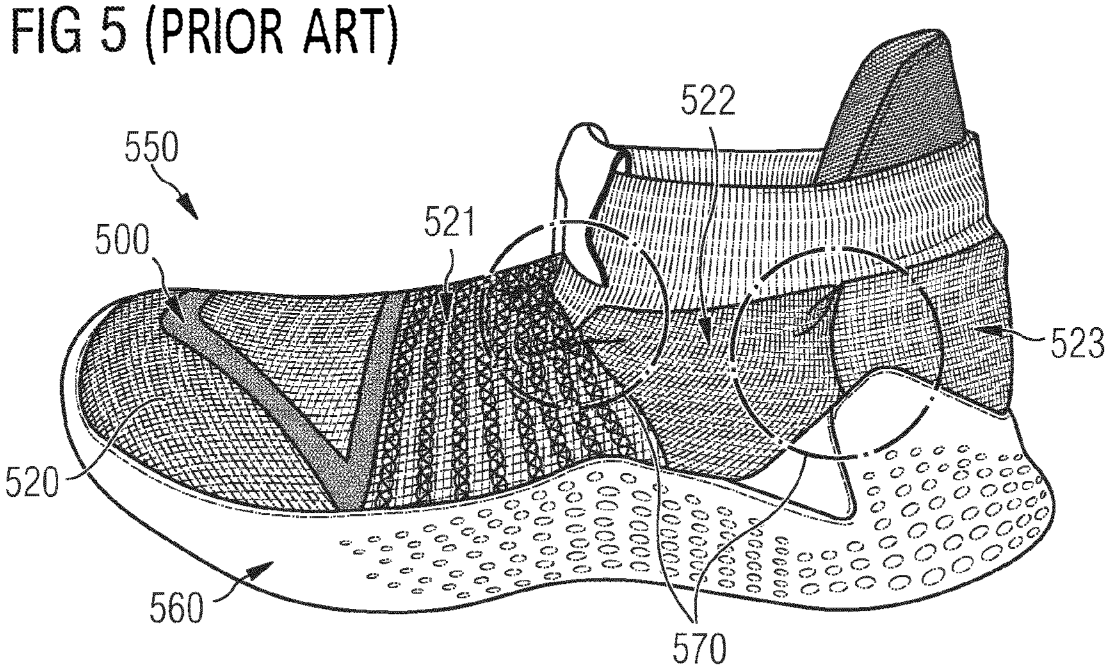
FIG 5 (PRIOR ART)
FIG. 5 shows an embodiment of the prior art illustrating a shoe.

FIG. 5 depicts a shoe 550 manufactured according to methods known from the prior art that includes an upper 500 and a sole 560. The upper 500 includes a first tubular textile layer folded into a second tubular textile layer 520, wherein both layers are mainly knitted textile layers similar to the shoe 450 depicted in FIG. 4. However, the shoe 550 does not include a polygonal first zone including a first yarn incorporated into the first textile layer as defined by the present invention. The lack of such at least one first zone results in wrinkles, creases and folds 570 within the second tubular textile layer 520 and the upper 500 of the shoe 550 as depicted in FIG. 5. The wrinkles, creases and folds 570 of the shoe 550 occur in a region between a quarter area 522 and a heel area 523 and also at an instep area 521, which leads to a cheap and low-quality appearance and overall look of the shoe 550.

Figure 6:
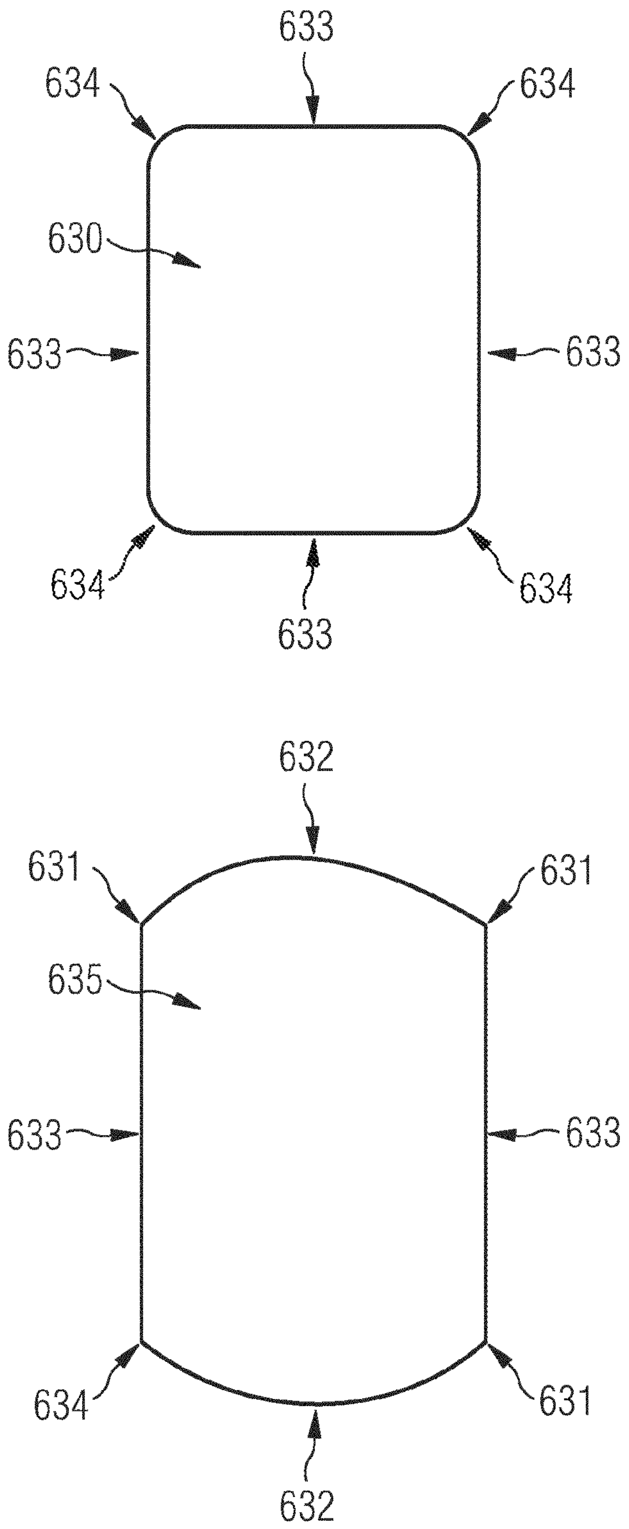
FIG. 6 shows an embodiment schematically illustrating different shapes of the at least one first zone.

FIG. 6 schematically illustrates two examples of differently shaped polygonal first zones 630 and 635. The polygonal first zone 630 includes straight edges 633 and rounded off corners 634. Alternatively, the polygonal first zone 635 includes straight edges 633 in addition with rounded off edges 632 and corners 631. The different shapes of the polygonal first zone may be adapted according to its intended location at an upper of a shoe. For example, a rounded off edge 632 may provide an optimized shape of a polygonal first zone, if adapted to be located around an ankle of a wearer's foot.

Some embodiments described herein relate to an upper for a shoe that includes a first tubular textile layer and a second tubular textile layer, wherein the first tubular textile layer is at least partially surrounded by the second tubular textile layer thus forming an internal textile layer and an external textile layer. The first tubular textile layer of the upper for a shoe includes a first zone, the first zone includes a first yarn, the first tubular textile layer includes a second yarn, wherein the first yarn is more resilient than the second yarn, and wherein the first zone comprises a polygonal shape.

In any of the various embodiments described herein, at least 40% of the first tubular textile layer or the second tubular textile layer may be knitted.

In any of the various embodiments described herein, the first zone may be incorporated into the first tubular textile layer using an intarsia knitting technique.

Some embodiments described herein relate to a method of manufacturing an upper for a shoe, wherein the method includes manufacturing a first tubular textile layer having a first zone, wherein the first zone has a polygonal shape, manufacturing a second tubular textile layer, and surrounding at least partially the first tubular textile layer with the second tubular textile layer, wherein the first zone includes a first yarn and the first tubular textile layer includes a second yarn, and wherein the first yarn is more resilient than the second yarn.

In any of the various embodiments described herein, the polygonal shape of the first zone may include less than 20 corners.

What is claimed is:

1. An upper for a shoe, the upper comprising:

a first tubular textile layer and a second tubular textile layer, wherein the first tubular textile layer is at least partially surrounded by the second tubular textile layer thus forming an internal textile layer and an external textile layer and defining a foot-receiving opening;

wherein the first tubular textile layer comprises:

a first zone, the first zone comprises a first yarn; and a second zone that is located on a first side of the first zone, the foot-receiving opening being located on a second side of the first zone, and the first side being opposite the second side across the first zone; and wherein the first tubular textile layer comprises a second yarn and the second zone comprises a third yarn different from the first yarn, wherein the first yarn and the third yarn are more resilient than the second yarn;

wherein the first zone comprises a polygonal shape that includes a first corner on a medial side of the upper, a second corner on a lateral side of the upper, and an edge extending between the first corner and the second corner, wherein the polygonal shape comprises a polygonal border defined by a transition from the first yarn in the first zone to one of the second yarn and the third yarn outside the first zone, and wherein an entirety of the polygonal border within the first tubular textile layer is further defined by a transition from a first fabric type in the first zone to one or more different fabric types outside of the first zone, wherein the first fabric type differs from the one or more different fabric types by a characteristic;

wherein the second zone is located at an instep area of the first tubular textile layer;

wherein the first zone forms a first part of a collar region of the first tubular textile layer; and wherein a second part of the collar region of the first tubular textile layer is outside of the first zone and the second zone, and the first part of the collar region and the second part of the collar region both adjoin the foot-receiving opening.

2. The upper of claim 1, wherein the first yarn comprises an elastic yarn having an elastic thread as a core and a polyester yarn wrapped around this core as a sheath.

3. The upper of claim 1, wherein at least a part of the first tubular textile layer or the second tubular textile layer is knitted.

4. The upper of claim 1, wherein the polygonal shape of the first zone comprises less than 20 corners.

5. The upper of claim 1, wherein the first tubular textile layer and the second tubular textile layer are manufactured as a one-piece element.

6. The upper of claim 5, wherein the first tubular textile layer is folded into the second tubular textile layer or the second tubular textile layer is at least partially folded over the first tubular textile layer.

7. A shoe comprising an upper according to claim 1.

8. A method of manufacturing an upper for a shoe, the method comprising:

manufacturing a first tubular textile layer comprising a first zone, wherein the first zone comprises a polygonal shape; and manufacturing a second tubular textile layer; and surrounding at least partially the first tubular textile layer with the second tubular textile layer;

wherein the first zone comprises a first yarn, the first tubular textile layer comprises a second yarn, wherein the first yarn is more resilient than the second yarn, the polygonal shape of the first zone comprises a polygonal border defined by a transition from the first yarn within the first zone to the second yarn outside the first zone, and the polygonal shape includes a first corner on a medial side of the upper, a second corner on a lateral side of the upper, and an edge extending between the first corner and the second corner, and wherein an entirety of the polygonal border within the first tubular textile layer is further defined by a transition from a first fabric type in the first zone to one or more different fabric types outside of the first zone, wherein the first fabric type differs from the one or more different fabric types by a characteristic;

wherein the first zone forms at least a first part of a collar region of the first tubular textile layer of the upper, and wherein at least a second part of the collar region of the first tubular textile layer is outside of the first zone, and the first part of the collar region and the second part of the collar region both adjoin the foot-receiving opening.

9. The method of claim 8, wherein the first yarn comprises an elastic yarn.

10. The method of claim 8, wherein manufacturing the first tubular textile layer and manufacturing the second tubular textile layer further comprises knitting at least a part of the first tubular textile layer or the second tubular textile layer.

11. The method of claim 8, wherein manufacturing the first tubular textile layer and manufacturing the second tubular textile layer further comprises knitting at least 40% of the first tubular textile layer or the second tubular textile layer.

12. The method of claim 8, wherein manufacturing the first tubular textile layer comprising the first zone further comprises, incorporating the first zone into the first tubular textile layer by an intarsia knitting technique.

13. The method of claim 8, further comprising manufacturing the first tubular textile layer and the second tubular textile layer as a one-piece element; and folding the first tubular textile layer into the second tubular textile layer or folding the second tubular textile layer at least partially over the first tubular textile layer.

14. A method of manufacturing a shoe comprising:

manufacturing an upper according to claim 8; and attaching a sole to the upper.

15. The upper of claim 1, wherein the first zone is completely covered by the second tubular textile layer.

16. The method of claim 8, wherein the first zone is completely covered by the second tubular textile layer.

* * * * *